(12) United States Patent
Woo

(10) Patent No.: US 7,591,489 B2
(45) Date of Patent: Sep. 22, 2009

(54) DETACHABLE PIPE JOINT

(76) Inventor: Yang Ho Woo, 202-401, Garak Town Apt. 1175, Hadan 1-dong, Saha-gu, Busan (KR) 604-762

( * ) Notice: Subject to any disclaimer, the term of this patent is extended or adjusted under 35 U.S.C. 154(b) by 0 days.

(21) Appl. No.: 11/964,814

(22) Filed: Dec. 27, 2007

(65) Prior Publication Data

US 2008/0157523 A1    Jul. 3, 2008

(30) Foreign Application Priority Data

Jan. 3, 2007    (KR) .................. 10-2007-0000451

(51) Int. Cl.
*F16L 23/00* (2006.01)
(52) U.S. Cl. .................. 285/365; 285/407; 285/413
(58) Field of Classification Search .................. 285/365, 285/366, 367, 409, 410, 411, 407, 413, 420
See application file for complete search history.

(56) References Cited

U.S. PATENT DOCUMENTS

| 1,007,326 | A | * | 10/1911 | Boyd | 285/365 |
| 4,326,737 | A | * | 4/1982 | Lehmann | 285/365 |
| 4,606,111 | A | * | 8/1986 | Okazaki et al. | 285/365 |
| 4,640,530 | A | * | 2/1987 | Abbes et al. | 285/365 |
| 4,660,869 | A | * | 4/1987 | Gabus | 285/365 |
| 4,693,502 | A | * | 9/1987 | Oetiker | 285/365 |
| 5,904,382 | A | * | 5/1999 | Bronnert | 285/365 |
| 6,726,254 | B2 | * | 4/2004 | Feichtinger | 285/365 |

FOREIGN PATENT DOCUMENTS

JP    03272387 A    * 12/1991

* cited by examiner

*Primary Examiner*—David E Bochna
(74) *Attorney, Agent, or Firm*—Ladas & Parry LLP

(57) ABSTRACT

Provided is a joint which can be easily detached from and attached to pipes, in which a flange joint is connected airtightly at a connection portion of medium-size or large-size pipes, without using bolts. In the pipe joint, flanges are formed at both ends of connection tubes for respective pipes, connection units are fitted with the flanges, to then make the flanges and the connection units easily connected using a connector, respectively, in order to prevent the flanges from seceding from the connection units, respectively, a protrusion and an O-ring groove are formed at the end of one connection tube to thus make an O-ring fitted into the O-ring groove, and a concave portion is formed on the inner circumference of the other connection tube, to thereby closely contact the O-ring at the state where the protrusion closely contacts the groove, to thus maintain air-tightness. Therefore, the pipe joint can be easily detached from and attached to pipes, to improve a workability of connecting pipes, enhancing a durability of the pipe joint, and remarkably reducing a manufacturing cost of the pipe joint.

1 Claim, 4 Drawing Sheets

PRIOR ART

DETACHABLE PIPE JOINT

CROSS-REFERENCE TO RELATED APPLICATIONS

This application claims the benefit of Korean Patent Application No. 10-2007-0000451, filed on Jan. 3, 2007, in the Korean Intellectual Property Office, the disclosure of which is incorporated herein by reference.

BACKGROUND OF THE INVENTION

1. Field of the Invention

The present invention relates to a pipe joint which can be easily detached from and attached to pipes, and more particularly, to a pipe joint which can be easily detached from and attached to pipes, instead of a conventional a flange joint using a number of bolts, to thus remarkably reduce a manufacturing cost of the pipe joint.

2. Description of the Related Art

Detachable screw or flange joints and non-detachable weld joints are applied to pipe joints.

In the case that various kinds of devices such as valves, pumps, filters and heat exchangers which are connected in the middle of pipes, should be replaced with new ones in an operational process, screw joints and flange joints which can be detached from and attached to pipes are applied as pipe joints. Since it is difficult to apply screw joints to the medium-size or large-size pipes, flange joints which are fixedly connected using a number of bolts are applied thereto.

In the case of the flange joints, flanges having a predetermined width are formed along the circumferential direction at the ends of the pipes, respectively, and a packing is inserted at a joint portion where the pipes are connected. Then, the flanges are coupled using a number of bolts. Accordingly, the width of the respective flanges should be increased so that bolts can be fitted and tightened at the end of the pipes, to thus cause weight of the piping materials to be increased. In addition, since a number of bolt holes should be mechanically worked in the flanges, a productivity of the flange joints is reduced and a manufacturing cost thereof is increased. Further, since a number of bolts should be coupled at the time of connecting pipes using flange joints, and tightened uniformly at the time of tightening the bolts, a workability of connecting pipes is remarkably lowered. Further, when the flange joints are disassembled and assembled, bolts may be worn or damaged to thus make it difficult to connect pipes using the flange joints.

In order to improve the conventional problems of the flange joints, a connection tube which can be fixedly connected with pipes while maintaining air-tightness of a flange portion without using coupling bolts has been proposed. Here, a number of O-ring fitters are formed at one side of the connect ion tube, and a fixing portion into which one O-ring is fitted is formed at the other side thereof. The number of O-ring fitters which are formed at one side of the connection tube, are inserted into one member and the fixing portion which is formed at the other side of the connection tube and the flange portion which is formed in the other member are fixed by means of clips at the state where the former faces the latter. However, such a connection tube may be loosened and separated from the pipes if it is highly pressurized, to thereby make fluid leak from the pipes.

In addition, there has been proposed a conventional pipe joint where a locking protrusion and a latch protrusion are formed at both ends of a connection plate having a concave groove into which a flange portion formed at the leading end of a connection tube is simultaneously fitted, so that the locking protrusion is locked by the latch protrusion. However, such a conventional pipe joint is not influenced by a low pressure of fluid flowing in the pipe, but may be deformed by a high pressure thereof to thereby make fluid leak from the pipes.

Besides, a clamp type connection unit which is connected with pipes at the state where flanges formed at the ends of the pipes are fitted with a concave portion of a connection plate of the pipes, respectively, has been proposed. However, a flange fitter of such a clamp type connection unit may be deformed if it receives a high pressure, to thereby make fluid leak from the pipes.

FIG. 1 is a cross-sectional view of a conventional flange joint. It is difficult to form tapered screws at the joint portions of connection tubes 4 and 5 for medium-size or large-size pipes. Flange 10a having a predetermined width are respectively formed circumferentially at the ends of both the connection tubes 4 and 5, and a number of bolt holes 10d are mechanically worked on the flanges. A packing 10b is fitted between the flanges 10a in order to maintain air-tightness of the joint portions, and then the number of bolts 10c are tightened to connect the flanges with each other.

As described above, since the number of bolts 10c are tightened in the case of the flange joints, it consumes much working time to tighten the bolts. Further, during tightening the bolts 10c, they may be worn or damaged. Further, the width of the flanges 10a should be widened in order to tighten the bolts 10c, to thus cause weight of the piping materials to be increased. In addition, since a number of bolt holes should be mechanically worked in the flanges, a productivity of the flange joints is reduced and a manufacturing cost thereof is increased.

SUMMARY OF THE INVENTION

To overcome inconveniences of the conventional art, it is an object of the present invention to provide a pipe joint which can be easily detached from and attached to pipes, instead of a conventional a flange joint using a number of bolts, to thus remarkably reduce a manufacturing cost of the pipe joint.

It is another object of the present invention to provide a pipe joint can be easily detached from and attached to pipes, to improve a workability of connecting pipes and enhancing a durability of the pipe joint.

To accomplish the above object of the present invention, there is provided a pipe joint for connecting pipes comprising:

flanges having a respectively predetermined identical width which are circumferentially formed at both ends of connection tubes for respective pipes which form a main body for the pipe joint for connecting the pipes;

connection units which are fitted with the flanges, in which a connector is axially installed at the ends of both sides of one connect ion unit and a groove into which the connector is inserted and locked is formed at the ends of both sides of the other connect ion unit;

a protrusion and an O-ring groove which are formed at the end of one connection tube; and a concave portion closely contacting the protrusion which is formed at the other connect ion tube, to thereby make the other side surface of the O-ring which is fitted into the O-ring groove closely contact the inner circumference of the concave portion, to thus maintain air-tightness.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE INVENTION

Figure 1:
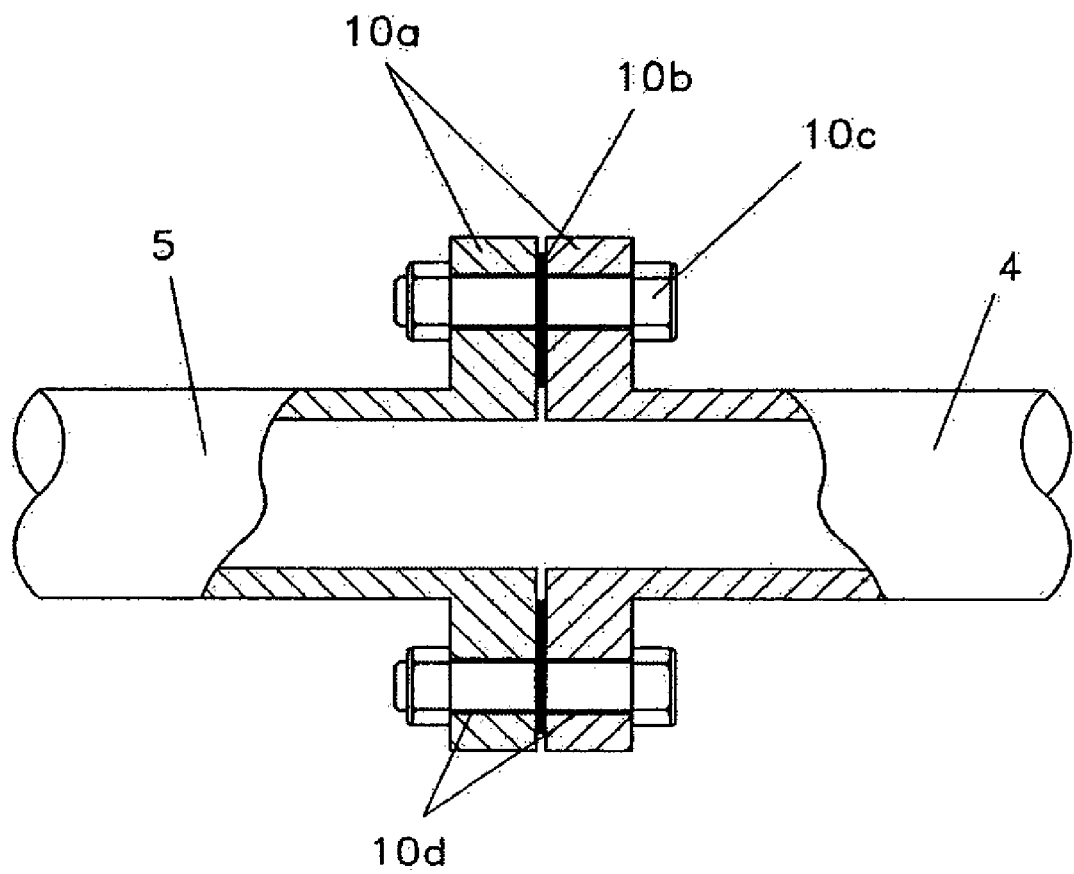
FIG. 1 is a cross-sectional view of a conventional flange joint.

Hereinbelow, a pipe joint which can be easily detached from and attached to pipes apparatus according to a preferred embodiment of the present invention will be described with reference to the accompanying drawings. Like reference numerals are assigned for like elements in the drawings.

A pipe joint according to the present invention does not employ bolts 10c of FIG. 1 which are tightened to connect flanges which connect pipes.

Figure 2:
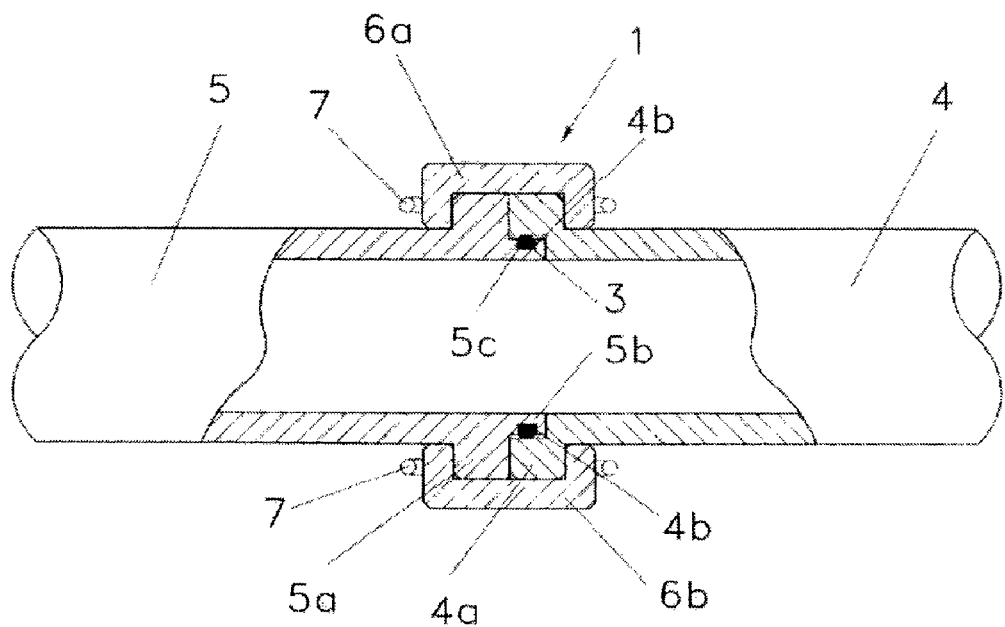
FIG. 2 is an assembled cross-sectional view showing a pipe joint according to the present invention.
Figure 3:
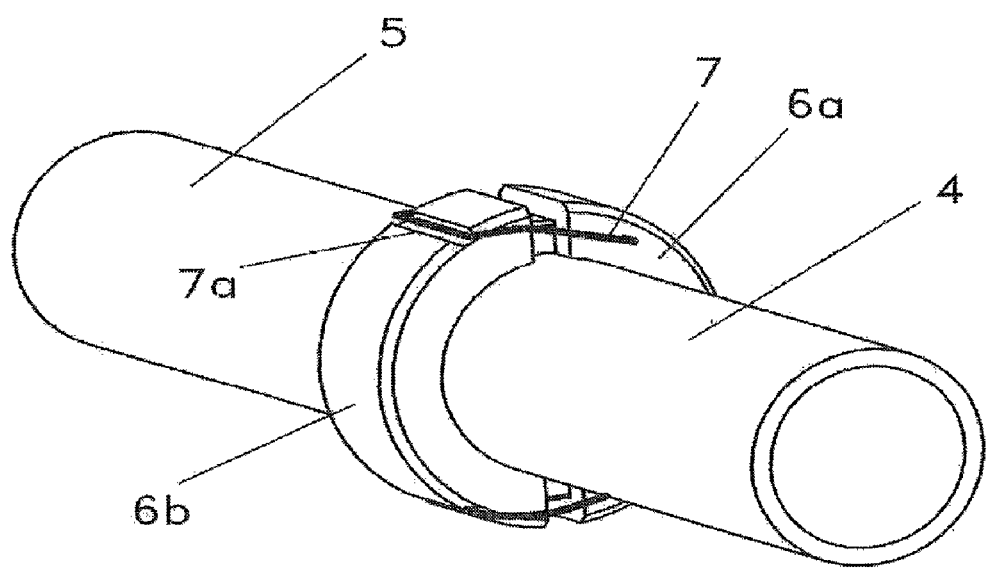
FIG. 3 is an assembled perspective view showing a pipe joint according to the present invention.
Figure 4:
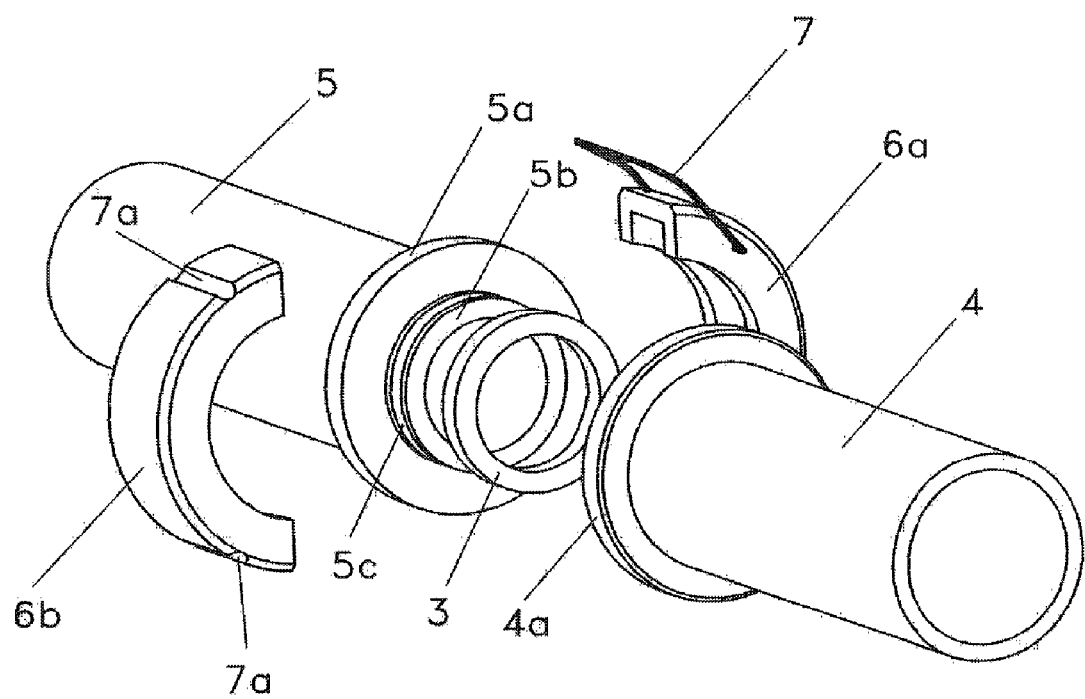
FIG. 4 is a disassembled perspective view showing a pipe joint according to the present invention.

As shown in FIGS. 2 to 4, a flange 4a and a concave portion 4b are formed at the end of one connect ion tube 4. A flange 4b having the same size as that of the flange 4a is formed at the end of the other connection tube 5, in which a protrusion 5b closely contacting the concave portion 4b is formed in the inner circumference of the flange 5a, and an O-ring groove 5c into which an O-ring 3 is fitted for air-tightness is formed on the outer circumference of the protrusion 5b. Connection units 6a and 6b coupling both the flanges 6a and 6b are provided in which each shape of the connection tubes 6a and 6b is semi-circular. A connector 7 is attached to both ends of one connection unit 6a or 6b and a groove 7a which is combined with the connector 7 is formed at both ends of the other connection unit 6b or 6a.

When the pipe joint according to the present invention is used, an O-ring 3 for air-tightness at the pipe joint portions is inserted into the inner diameter of the connection tube 4 of the other pipe at the state where the O-ring 3 is fitted into an O-ring groove 5c of the connection tube 5 of one pipe. By doing so, the O-ring 3 is closely fixed to the inner circumference of the connection tube 4 in the O-ring groove 5c, to thereby maintain air-tightness.

The two semi-circular connection units 6a and 6b are fitted into the two flanges 4a and 5a which closely contact each other, and then the connector 7 is locked into the groove 7a. Accordingly, the connection units 6a and 6b are prevented from seceding or being separated from each other. In addition, when the pipe joint is detached from the pipes, reversely to the above connection procedure, the connector 7 is separated from the groove 7a, in order to detach the two connection units 6a and 6b from the connection tubes 4 and 5, respectively. Accordingly, the two connection tubes 4 and 5 are easily separated each other.

Figure 5:
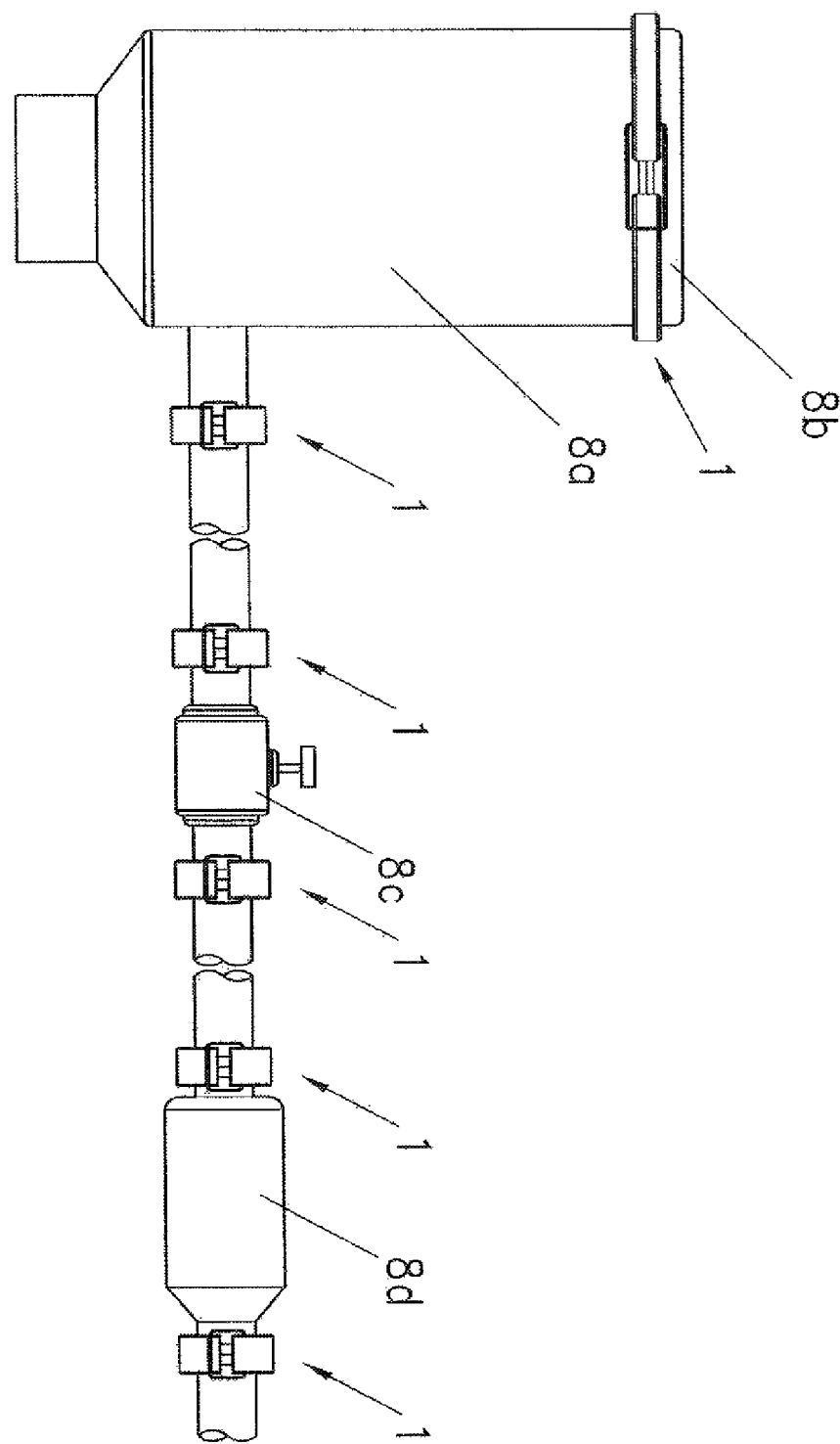
FIG. 5 is a diagram where pipe joints according to the present invention are applied.

FIG. 5 is a diagram where pipe joints according to the present invention are applied. In FIG. 5, a main body 1 for a pipe joint according to the present invention is applied to a sealed vessel 8a, a valve 8c, a reactor 8d, etc., respectively. The sealed vessel 8a requires for a high pressure or vacuum state in the vessel. The contents in the sealed vessel 8a can be identified and replaced with other contents via a vessel lid 8b. The vessel lid 8b of the sealed vessel 8a should be frequently opened and closed. There is also a seal between the vessel lid 8b and the sealed vessel 8a. The main body 1 of the pipe joint according to the present invention can be applied to a joint between the vessel lid 8b and the sealed vessel 8a, which is very useful for the purpose of quick opening and closing of the vessel and air-tightness of the vessel.

As described above, a pipe joint according to the present invention is provided to solve the shortcomings of a flange joint which is used for jointing medium-sized or large-sized pipes. The pipe joint includes: flanges 4a and 5a which are formed at both ends of connection tubes 4 and 5 for respective pipes; connection units 6a and 6b which are fitted with the flanges 4a and 5a, to then make the flanges 4a and 5a and the connection units 6a and 6b easily connected using a connector 7, respectively, in order to prevent the flanges 4a and 5a from seceding from the connection units 6a and 6b, respectively; a protrusion 5b and an O-ring groove 5c which are formed at the end of one connection tube 5; and a concave portion 4b which is formed on the end of the other connection tube 4, to thereby closely contact the protrusion 5b, in which an O-ring 3 is fitted into the O-ring groove 5c, and the inner diameter of the concave portion 4b of the other connection tube 4 closely contacts the inner circumference of the O-ring 3, to thus maintain air-tightness. Therefore, the pipe joint can be easily detached from and attached to pipes, and can be applied to a high pressure, to improve a workability of connecting pipes, enhancing a durability of the pipe joint, and remarkably reducing a manufacturing cost of the pipe joint. In addition, the main body 1 of the pipe joint can be quickly opened and closed.

The present invention is not limited to the above-described embodiment. It is apparent to one who has an ordinary skill in the art that there may be many modifications and variations within the same technical spirit of the invention.

What is claimed is:

1. A pipe joint for connecting pipes comprising:

flanges having a respectively predetermined identical width which are circumferentially formed at both ends of connection tubes for respective pipes which form a main body for the pipe joint for connecting the pipes;

connection units having an outer circumferential surface, the connection units being respectively fitted with the flanges, in which a connector is axially installed at an axis traversing a circumference of one connection unit at the respective ends of both sides of one connection unit and a groove into which the connector is inserted and locked is formed at the respective ends of both sides of the other connection unit, wherein the groove is formed to protrude within the outer circumferential surface of the other connection unit;

a protrusion and an O-ring groove which are respectively formed at the end of one connection tube; and a concave portion closely contacting the protrusion which is formed at the other connection tube, to thereby make the other side surface of the O-ring which is fitted into the O-ring groove closely contact the inner circumference of the concave portion, to thus maintain air-tightness.

* * * * *